United States Patent [19]
Oakes, Jr.

[11] 3,985,119
[45] Oct. 12, 1976

[54] SOLAR HEAT COLLECTOR
[76] Inventor: Francis W. Oakes, Jr., 3911 Tiverton Road, Randallstown, Md. 21133
[22] Filed: Oct. 1, 1975
[21] Appl. No.: 618,346

[52] U.S. Cl. .............................................. 126/271
[51] Int. Cl.² ......................................... F24J 3/02
[58] Field of Search ............................ 126/270, 271

[56] References Cited
UNITED STATES PATENTS

| | | | |
|---|---|---|---|
| 497,079 | 5/1893 | Severy | 126/271 |
| 1,683,266 | 9/1928 | Shipman | 126/271 |
| 1,801,710 | 4/1931 | Abbot | 126/271 |
| 2,688,923 | 9/1954 | Bonaventura et al. | 126/271 |
| 2,872,915 | 2/1959 | Bowen | 126/271 |
| 3,194,228 | 7/1965 | Barques | 126/271 |
| 3,215,134 | 11/1965 | Thomason | 126/271 |
| 3,884,217 | 5/1975 | Wartes | 126/270 |

Primary Examiner—Lloyd L. King
Attorney, Agent, or Firm—John F. McClellan, Sr.

[57] ABSTRACT

A solar energy collector system providing a mechanically oriented parabolic trough direct radiation collector having along the focal line a portion of a first fluid conduit system and outside the focal line a portion of a second fluid conduit system, sectionally in arcuate array about the first fluid conduit system; greenhouse energy-collection effect to conserve heat at the fluid conduit systems is also provided by means of a second collector system including a glass-front enclosure over the parabolic trough collector, and preheating of fluid entering the solar heat collection system is provided by means of an insulated compartment behind the parabolic trough through which return tubing of the first and second fluid collector systems pass; a valve provides for separate or for serial connection of the two systems; and an aluminum foil covering over a parabolic form provides for renewal of the reflective surface.

8 Claims, 5 Drawing Figures

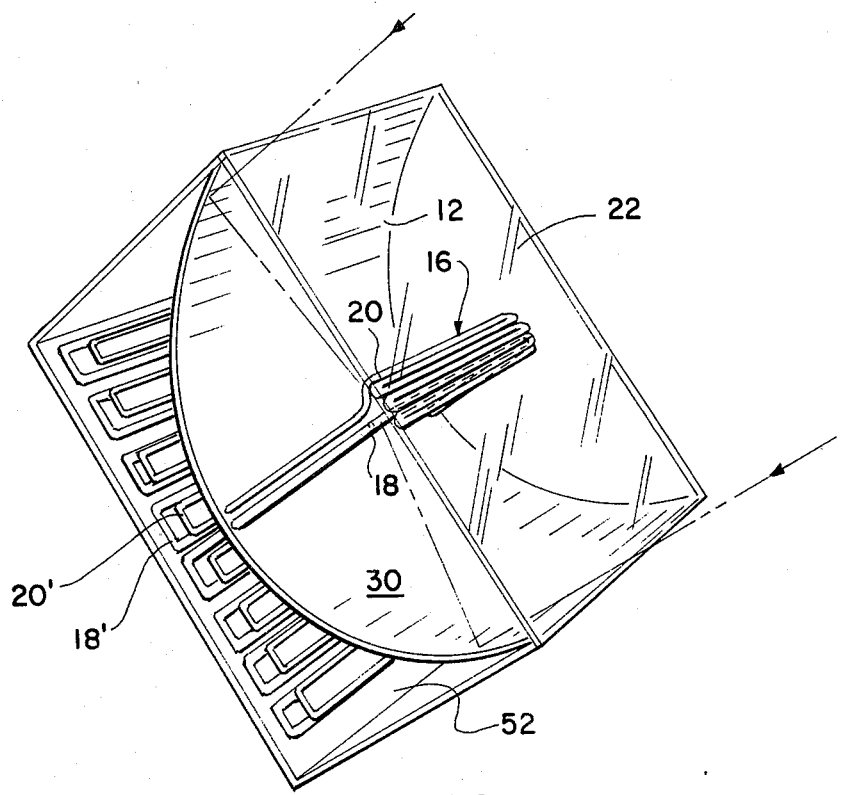
FIG. 3
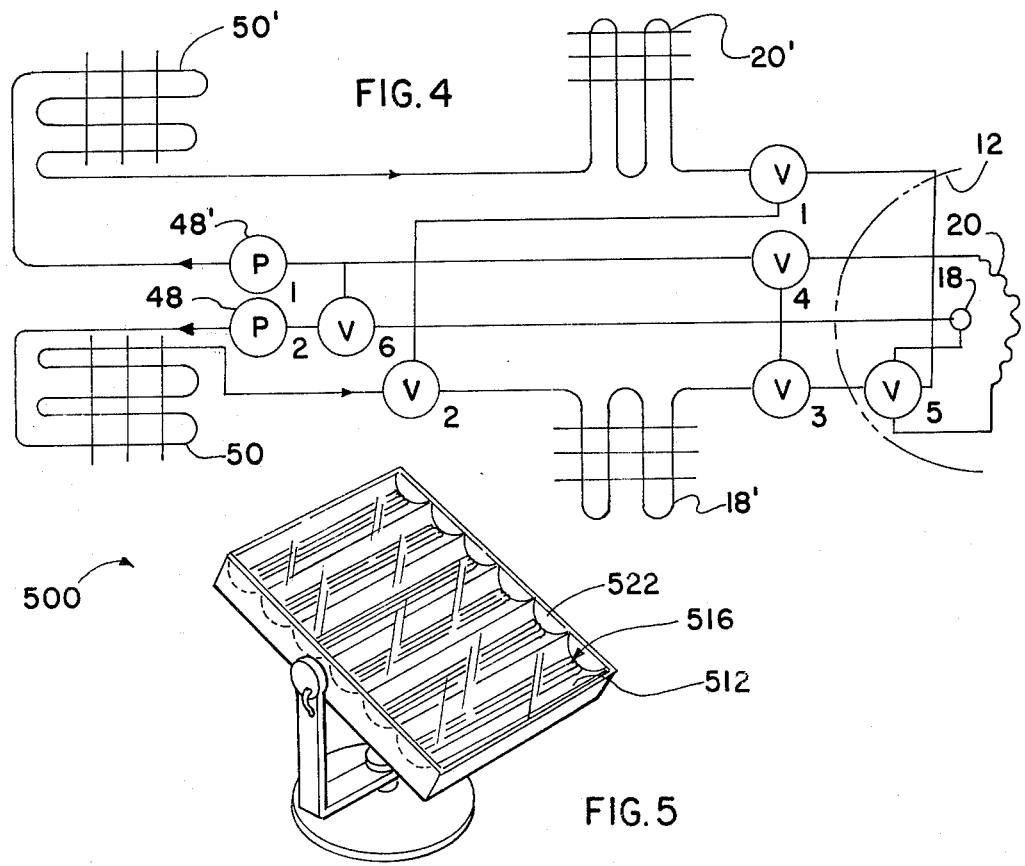
FIG. 4
FIG. 5

SOLAR HEAT COLLECTOR

This invention relates generally to energy utilization and specifically to solar energy collection and distribution.

In the prior art various systems having the general purpose of this invention have been described, including the reflector system described in U.S. Pat. No. 497,079 granted May 9, 1893, to M. L. Severy, which, like the others, fails to provide the combined features of the present invention.

A primary object of the invention is to provide an improved system for collecting and distributing heat from the sun, yielding greater efficiency at less cost than previously known systems.

Other objects of the invention are to provide a system of the type described which is inherently tolerant of misalignment relative to the sun, which is particularly adaptable for massing in one unit to multiply the amount of area exposed for energy collection, which uses not only direct radiative heating, but also greenhouse effect heating, which reduces re-radiation, and which provides either single or plural fluid systems, as desired.

Still further objects of the invention are to provide a system as described which is exceptionally light in weight so that loadings on supporting structures such as roofs are kept low, which is easy to maintain and repair, and which is economical to obtain and to use.

In brief summary given for cursive description purposes only, the invention includes an elongate reflective collector with means for conducting fluid through the focus for heating, means adjacently outside the focus for conducting fluid for heating, and means for retaining heat around the fluid conducting means.

The above and other objects and advantages of the invention will become more readily apparent on examination of the following description, including the drawings, in which:

FIG. 3 is an isometric view of a detail of the first embodiment of the invention with a portion removed to show interior arrangements;

FIG. 4 is a hydraulic circuit diagram; and

FIG. 5 is an isometric view of a second embodiment of the invention.

In the Figures, like reference numerals designate like parts.

Figure 1:
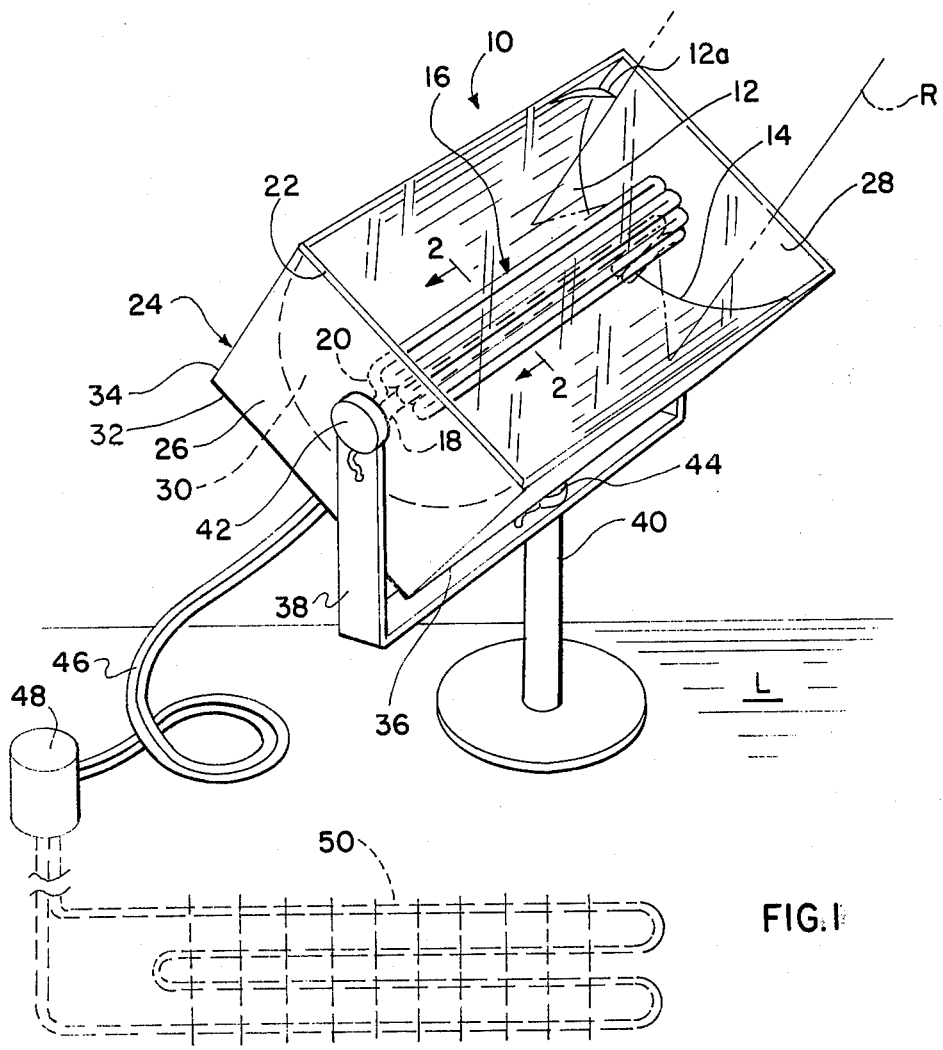
FIG. 1 is an isometric view of a first embodiment of the invention in operation.

FIG. 1 illustrates the collector invention 10 in operation in an exposed location L such as a rooftop. A horizontally extended reflector 12 having a parabolic cross-section 14 is provided as a feature of this invention for optical efficiency in radiation collecting and focussing. This may advantageously be of molded fibreglass with a reflective surface of cemented-on aluminum foil 12a. The reflector collects radiation R from the sun and focuses the radiation collected onto a tubular conduit array 16 comprising a first tube system 18 having a tube extending parallel with the reflector in the focal line and a second, folded, tube system 20 extending parallel with the first by outside the focus of the reflector, and generally forming a hemispherical group of tubes in section. Fluid in the conduit array 16 is heated directly by the radiation and also by greenhouse effect heating of the air surrounding it, contained by transparent front panel 22 which preferably is of light weight plastic material having the general transmissive characteristics of window glass. Alternatively, the front panel may be of ordinary window glass if desired. Further, double pane insulating glass may be used, if desired.

The front panel is held in place and the air around the tubular array is confined hermetically by a box-like frame 24 which preferably is molded of fibreglass, with insulation within, but which may be of light weight metal having an insulative covering on the inner face, or which may be of weather-resistant insulative fibreboard, or other suitable material. The ends 26, of the frame have reflective sheet 28 such as aluminum foil applied to the inner faces in heater chamber 30 defined by the ends, the reflector and the front panel. The frame has a back 32, top 34 and bottom 36, and has pivot supports in altitude 38 and azimuth 40 to permit continuous orientation toward the sun in any conventional manner, as for example by selsyn motors 42, 44 controlled by a selsyn programmer, not shown, or by any other usual heliostat mechanism.

Fluid in the tubular array, which may be water, ethylene glycol, freon, or other conventional liquid or gas used for the purpose of heat transfer, passes, after heating, through conventional means such as insulated flexible tubing 46, urged by any conventional means for pumping 48, and then through a conventional heat exchanger coil 50 in the space to be heated, and back into the tubular array in the heater exchanger for re-heating.

Figure 2:
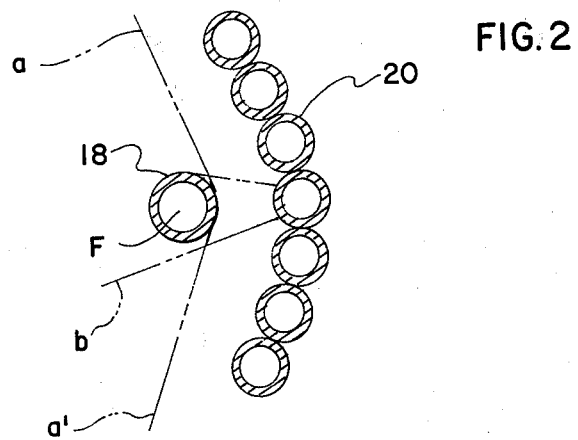
FIG. 2 is a sectional detail adapted from 2—2, FIG. 1.

FIG. 2, a section of the first tube system 18 portion and the second tube system 20 portion is at the focal line F of the reflector. The peripheral rays $a$ and $a'$ of the full beam on-axis heat tube system 18 and any portions of the beam such as b which pass by or reflect from the tube system 18 heat the tube system 20 surrounding, outside the focus, that portion of the tube system 18 lying along the focal line. This makes the system efficient when illuminated off-axis, when overfilled by scattering of sunlight, and when the reflector contour is less accurate than would otherwise be required.

FIG. 3, a detail view of the frame with the rear end removed to show associated parts, indicates the relation of the transparent front panel 22, the tubular array 16, with the proximate portions of the tube systems 18 and 20, the reflector 12, the heater chamber 30, and rearward of the reflector the preheat compartment 52. In the preheat compartment the tubes of the first and second tube systems leading from the pump are folded into respective proximate heat exchanger coil sections 18' and 20', insulated from the outside and warmed by heat transfer from the heater chamber. Fluid warmed here is then passed into the focal area, heated further, circulated out by the pumping means for heat exchange in whatever space is to be warmed, and returned for re-heating.

FIG. 4 indicates a system not specifically claimed as a part of the invention, but exemplifying a conventional means for carrying out a provision of the invention, providing either for the separate fluid systems 18', 20' to be maintained apart outside the collector unit 12, 18, 20, or to be used serially through sequential flow in valves $V_1$ through $V_6$ which are conventionally employed to isolate system 50 and produce return flow through system 20' in the preheat compartment, then through system 18' in the preheat compartment, then through system 20 in the heater chamber and finally through system 18 in the heater chamber, following which the fluid passes through pump $P_1$ and heat exchanger 50 and back through system 20'. Valves of the following types may be used: $V_1$, $V_2$, $V_3$, $V_4$ and $V_6$ are two-way valves; valve $V_5$ is a dual two-way valve.

FIG. 5 shows an embodiment 500 of the invention in which a number of reflector units 512 are juxtaposed in parallel in a large-area arrangement, each with an associated tubular conduit array 516. A single transparent front panel 522 may advantageously be employed. Fluid circuits, drive, and other details may be as described earlier. The lightweight, economical, shallow-depth design of the invention makes possible large-area collection without employing large-area optical precision, each element being independent, and the reflectivity of each being easily renewed if for any reason tarnished, by application of an additional layer of aluminum foil. It is evident that several layers of foil may be superimposed as for example using epoxy cement before any need to be removed, since distortion or moving the focal line outward does not cause loss of radiation, the spill-over from tube system 518 being caught by the shielding tube system 520; this same advantage is available with all embodiments, as is the smoothing over of small irregularities in the mold by application of the foil.

It will be apparent that the collector apparatus described herein can be employed for air conditioning purposes using the thermal or servel system.

Obviously many modifications and variations of the present invention are possible in light of the above teachings. It is, therefore, to be understood that within the scope of the appended claims the invention may be practiced otherwise than as specifically described.

What is claimed and desired to be protected by United States Letters Patent is:

1. In a collection system for solar energy, having a trough-like reflective collector, means passing along the focal area thereof for conducting fluid to be heated, means for circulating and extracting energy from the fluid heated, and means for orienting the reflective collector, the improvement comprising:

the reflective collector having a parabolic cross-section;

the means for conducting fluid including: a first tube system having a portion thereof passing along the focal line of the reflective collector; and a second tube system, having a portion thereof passing outside the focus of the reflective collector in parallel-spaced relation with said first tube system portion said second tube system portion being in the incoming beam of solar energy and arranged in front of said first tube portion.

2. In a collection system as recited in claim 1, a glass-like panel, and a frame with ends affixing the glass-like panel over the reflective collector and forming an airtight greenhouse effect heater chamber around said portions of the first and second tube systems.

3. In a collection system as recited in claim 2, the reflective collector including a form, and an aluminum foil surface cemented over the form.

4. In a collection system as recited in claim 3, the form being of fibreglass.

5. In a collection system as recited in claim 3, the frame including a preheat compartment behind the reflective collector, the first and second tube systems having respective coils therein.

6. In a collection system as recited in claim 5, said means for circulating including means for passing said fluid in sequence through said preheat compartment, then through said second tube system portion, then through said first tube system portion for thereby heating said fluid.

7. In a collection system as recited in claim 3, and additionally a plurality of reflective collectors juxtaposed as a unit to the first said reflective collector, each reflective collector having a said means for conducting fluid.

8. In a collection system as recited in claim 1, said portion of the second tube system comprising a plurality of tubular members sectionally in arcuate array about said portion of the first tube system.

* * * * *